United States Patent
Felman

Patent Number: 6,065,157
Date of Patent: May 23, 2000

[54] EAR WARMERS

[76] Inventor: Cynthia C. Felman, 29244 Greenwater Rd., Malibu, Calif. 90265

[21] Appl. No.: 09/361,647
[22] Filed: Jul. 27, 1999
[51] Int. Cl.⁷ .............................. A61F 11/06; G02C 3/00
[52] U.S. Cl. .................................. 2/209; 2/13; 351/123; 351/156
[58] Field of Search .................. 2/209, 13, 423, 2/449, 452, 15; 351/123, 122, 155, 156, 157

[56] References Cited

U.S. PATENT DOCUMENTS

| | | | |
|---|---|---|---|
| 1,117,968 | 11/1914 | De Bobory | 2/426 |
| 1,621,629 | 3/1927 | Dawson | 2/209 |
| 1,772,223 | 8/1930 | Pence | 2/209 |
| 2,532,852 | 12/1950 | Oaks | 2/209 |
| 4,657,364 | 4/1987 | Murrell | 351/156 |
| 4,670,911 | 6/1987 | Dunford | 2/423 |
| 4,751,746 | 6/1988 | Rustin | 2/13 |
| 5,092,667 | 3/1992 | Bagley | 351/156 |
| 5,201,856 | 4/1993 | Edwards | 2/209 |
| 5,421,037 | 6/1995 | Schulze | 2/209 |
| 5,617,589 | 4/1997 | Lacore et al. | 2/209 |
| 5,943,703 | 8/1999 | Avila, Jr. | 2/13 |

Primary Examiner—Amy B. Vanatta
Attorney, Agent, or Firm—Lyon & Lyon LLP

[57] ABSTRACT

Ear warmers which are carried by the frame of a pair of eye glasses and comprised of a pair of soft pliable ear covers wherein each of the ear covers has a perforated side panel, a rear flap portion, a tubular sleeve projecting forwardly from the side panel and an attachment strap projecting laterally from the rear flap portion. The tubular sleeves are adapted to receive portions of the templates of the eye glasses proximate the ear pieces to secure the ear warmers to the eye glasses such that upon securing together the extended ends of the attachment straps at the back of the wearers' heads, the side panels and rear flap portions of the ear warmers extend comfortable along and about the wearer's ears to warm and protect the ears.

4 Claims, 1 Drawing Sheet

U.S. Patent
May 23, 2000
6,065,157
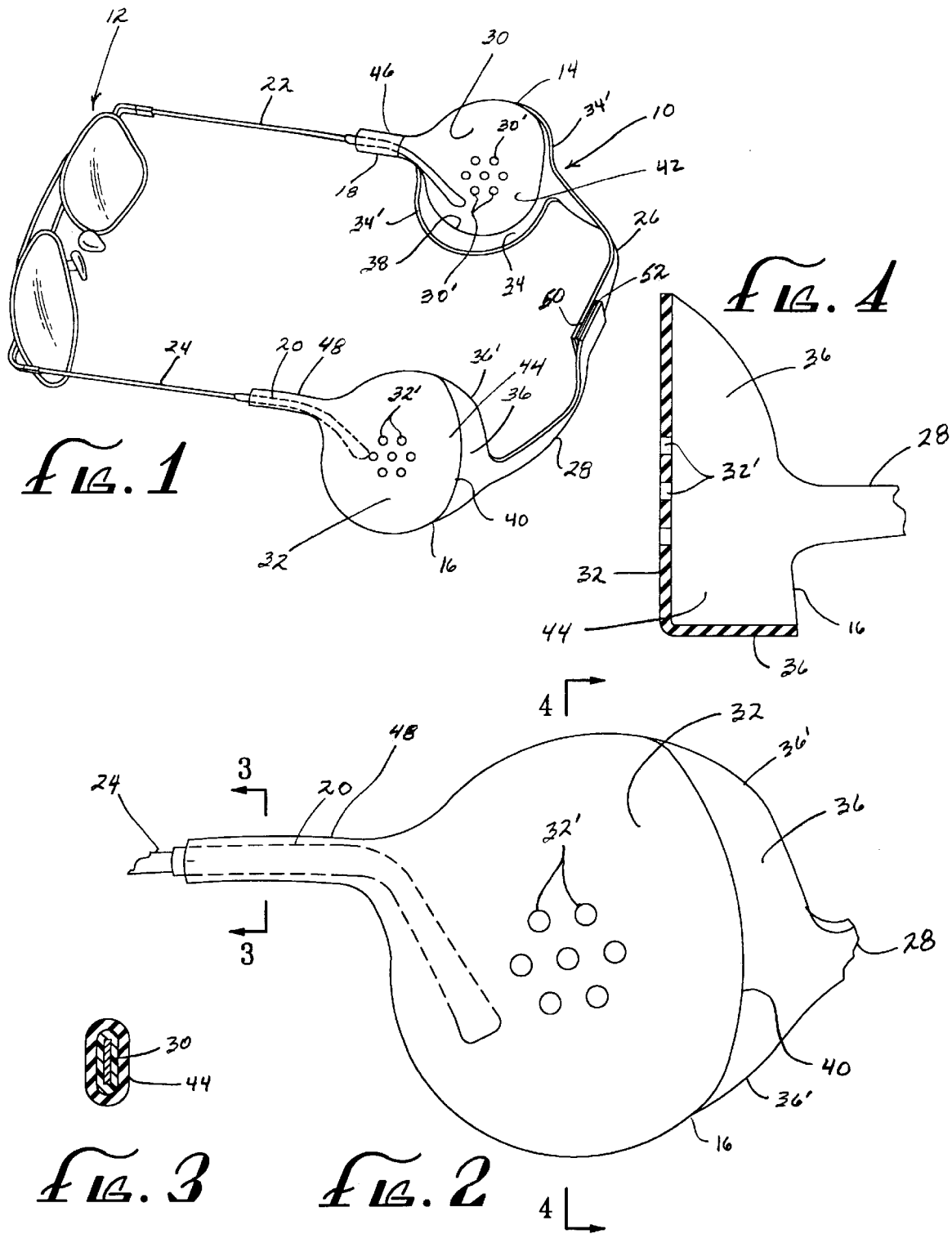

EAR WARMERS

BACKGROUND OF THE INVENTION

The present invention relates to ear warmers and, more particularly, to an improvement in ear warmers of the type which are carried by a pair of glasses. Many peoples' ears are highly sensitive to wind and cold. While a wide variety of ear warming devices have heretofore been developed, they are often relatively bulky as they are designed for very cold conditions and are thus somewhat cumbersome to carry. Such devices also are ill suited for use while engaging in athletic activities, such as jogging. While lightweight ear warmers are available, they are often not windproof and like the more bulky devices, generally press tightly against the wearer's ears, rendering such devices too uncomfortable for many people. In addition to such shortcomings, ear warmers are typically hard on the appearance of the wearer's hair, further detracting from the popularity of such devices.

It would be highly desirable to provide ear warmers which achieve their intended purpose without the shortcomings of the devices presently available. The ear warmers of the present invention obtain such a result. They provide protection from the cold and wind without the need for a bulky construction. They are well suited for use while engaging in jogging and other athletic endeavors, and they do not press against the wearer's ears so as to cause discomfort. They utilize eye glasses as a carrying element and in a manner so as to minimize the effect of "hat-hair." The ear warmers of the present invention not only effectively protect and warm the ears, they are easy to carry, extremely lightweight, comfortable to wear and economical to manufacture.

SUMMARY OF THE INVENTION

Briefly, the present invention comprises a pair of ear warmers which are carried by the frame of a pair of eye glasses and comprise two ear covers formed of a soft, pliable and windproof material which are configured to extend along and about the wearer's ears. The covers define forwardly projecting sleeves for receiving laterally spaced portions of the templates of the eye glasses to secure the ear warmers to the glasses. The covers also define laterally projecting straps which are joined together at their extended ends behind the wearer's head and cooperate with the template receiving sleeves to maintain the ear covers in their extended configuration along and about the wearer's ears to protect the ears without pressing against the ears and creating discomfort.

It is the principal object of the present invention to provide improved ear warmers which are windproof, light in weight and comfortable to wear.

It is another object of the present invention to provide ear warmers which are of simple construction and economical to manufacture.

It is a further object of the present invention to provide ear warmers which minimize the deleterious effect of the ear warmers on the appearance of the wearer's hair upon removal of the ear warmers.

It is a still further object of the present invention to provide ear warmers which are suitable for use while engaging in athletic endeavors.

These and other objects and advantages of the present invention will become readily apparent from the following detailed description taken in conjunction with the accompanying drawings.

BRIEF DESCRIPTION OF THE DRAWINGS

FIG. 1 is a perspective view of the ear warmers of the present invention shown in place on a pair of eye glasses.

FIG. 2 is an enlarged perspective view of a portion of one of the ear covers of the present invention disposed about an ear piece of a pair of eye glasses.

FIG. 3 is a sectional view taken along the line 3—3 of FIG. 2.

FIG. 4 is a sectional view taken along the line 4—4 of FIG. 2.

DESCRIPTION OF THE PREFERRED EMBODIMENT

Referring now in detail to the drawings, the ear warmers 10 of the present invention are adapted to be carried by a pair of eye glasses 12 and comprise a pair of ear covers 14 and 16 which are adapted to engage laterally spaced portions 18 and 20 of templates 22 and 24, extend along and about the wearer's ears (not shown) and be held in place by detachable strap members 26 and 28. The ear covers 14 and 16 are formed of a soft pliable insulating material which is also windproof and capable of retaining its shape when washed. Neoprene has been found to be well suited for use in forming covers 14 and 16. Other suitable materials could include polyester fleece-type materials and a fabric marketed by ADS Properties Corp. under the federally registered trademark POLARTEC.

Ear covers 14 and 16 are mirror images of each other and define substantially flat side panels 30 and 32 and arcuately tapered rear flap portions 34 and 36. The side panels 30 and 32 are of a generally elliptical configuration to match the general contour of the wearer's ear and preferably define perforations 30' and 32' therein. The perforations not only prevent the side panels from unduly limiting the wearer's ability to hear but also allow air to pass therethrough so that the ear warmers can both breathe and not bow in the wind, thereby enhancing both the comfort and warming efficiency of the ear warmers 10. The rear flap portions 34 and 36 of the ear covers are sewn to the side panels 30 and 32 respectively along seams 38 and 40 and taper inwardly toward the wearer's head along their inner edges 34' and 36'. In use, the rear flap portions 34 and 36 extend perpendicularly from the side panels 30 and 32 toward the wearer's head and about the rear and lower portions of his or her ears and thereby cooperate with the side panels 30 and 32 to form ear receiving pockets 42 and 44. So configured, the ear covers 14 and 16 readily accommodate the ear pieces and templates of the eyeglasses while effectively covering the wearer's ears.

To secure the ear covers 14 and 16 to the eye glasses and hold the ear covers in place about the wearer's ears, forwardly projecting tubular sleeves 46 and 48 are provided on the forward edges of the side panels 30 and 32 which are adapted to receive laterally spaced portions 18 and 20 of the templates 22 and 24 of the eye glasses 12. Additionally, attachment straps 26 and 28 are provided on the ear covers which project inwardly in opposed directions from and parallel to the back sides of the rear flap portions 34 and 36 of the ear warmers so as to extend about the wearer's head. The extended end portions of strap portions 26 and 28 are preferably provided with mating hook and pile-type fastening members 50 and 52 for securing the ends of the strap together about the backside of the wearer's head. Other types of fastening members could also be employed.

So secured, the attachment straps 26 and 28 cooperate with the temple receiving sleeves 46 and 48 of the ear warmers to hold the ear covers in place and in proper orientation so as to completely cover the wearer's ears. The orientation of the receiving sleeves on the templates of the eye glasses in cooperation with the attachment straps also allow the side panels and rear flap portions of the ear warmers to effectively protect the ear without bearing against the sides of the ear and thus avoid the discomfort associated with conventional ear warmers. The product configuration and the soft pliable material of which the ear warmers are formed render the ear warmers highly suitable for use while engaging in athletic endeavors such as jogging and skiing as the soft construction of the device will not injure the user in the event of a fall. The construction of the present invention also allows the ear warmers to be worn under other equipment such as hats and helmets.

Various changes and modifications may be made in carrying out the present invention without departing from the spirit and scope thereof. Insofar as these changes and modifications are within the purview of the appended claims, they are to be considered as part of the invention.

What is claimed is:

1. A pair of ear warmers adapted to be carried by the templates of a pair of eye glasses and extend along and about the wearer's ears to warm and protect the ears, said ear warmers comprising a pair of ear covers formed of a soft and windproof material, each of said covers defining a substantially planar side panel, an arcuate rear flap portion secured to and extending substantially perpendicularly from said side panel along a first edge portion thereof, a tubular sleeve projecting forwardly from a second edge portion of said side panel for receiving a portion of a template of the eye glasses therein whereby said covers are secured to the eye glasses, and an attachment strap projecting laterally from the rear flap portion, said strap having a fastening member thereof adapted to cooperate with the fastening member on the other of said straps for securing the ear warmers about the wearer's head and the ear covers about the wearer's ears such that said side panels extend adjacent to and over side portions of the wearer's ears and the rear flap portions extend adjacent to and about lower and rear portions of the wearer's ears whereby the ears are warmed and protected.

2. The ear warmers of claim 1 wherein said first edge portion of each of said side panels defines a first seam, said rear flap portions being sewn to said side panels along said first seam.

3. The ear warmers of claim 1 wherein said material is neoprene.

4. The ear warmers of claim 3 wherein said side panels each define a plurality of perforations therein.

* * * * *